United States Patent Office 3,345,536
Patented Oct. 3, 1967

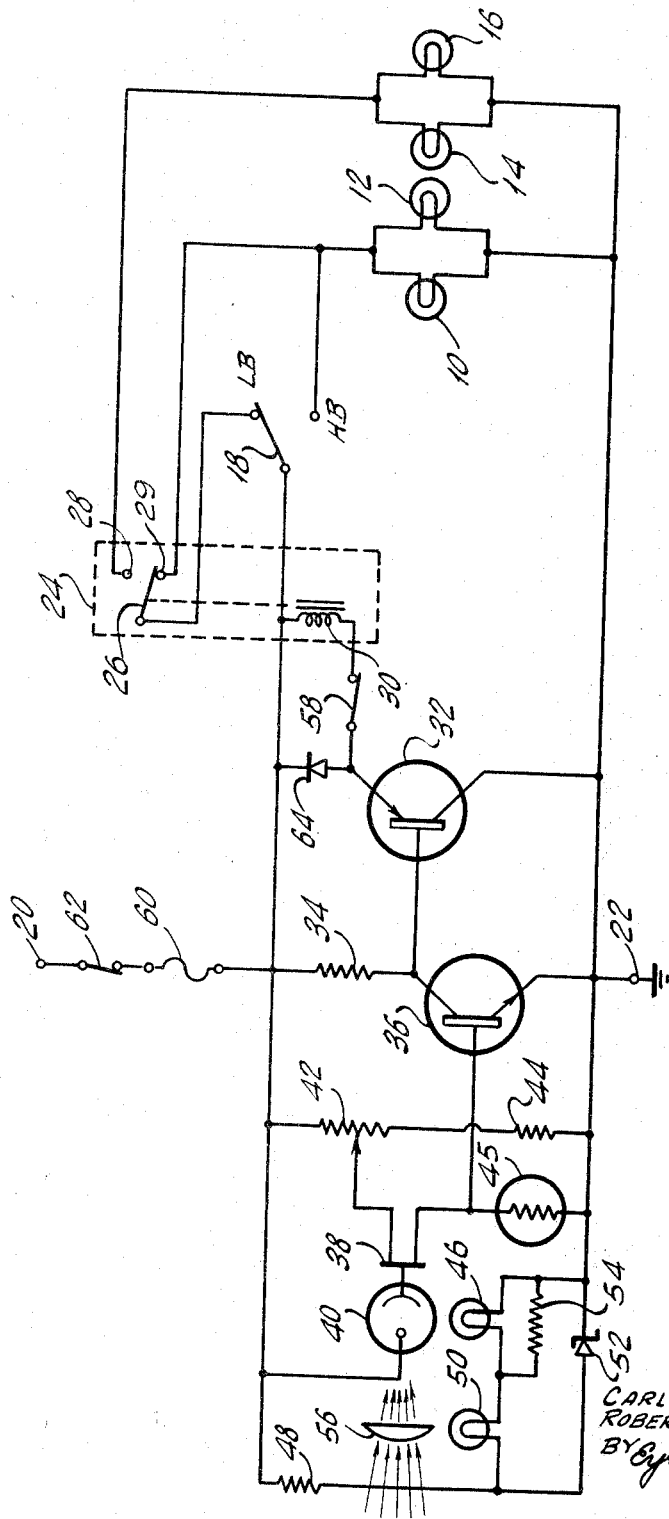

3,345,536
PHOTOELECTRIC CONTROL CIRCUIT
Carl E. Atkins, Montclair, and Robert L. Ziolkowski, South Plainfield, N.J., assignors, by mesne assignments, to Wagner Electric Corporation, a corporation of Delaware
Filed Feb. 21, 1964, Ser. No. 346,490
4 Claims. (Cl. 315—83)

The present invention relates to the automatic switching of automobile headlamps in response to light from the headlamps of other motor vehicles as they approach and pass, and for this purpose provides a non-oscillatory circuit which is very reliable, compact, inexpensive and simple and which will operate directly off an automobile battery.

In accordance with the present invention, light from a source which is carefully controlled in intensity is directed at a photoelectric cell that is connected in the gate to source path of a field effect transistor to reverse bias the field effect transistor at a certain level of conductivity. The photoelectric cell is positioned in an automobile so that the light from the headlamps of a motor vehicle approaching the automobile will strike the photoelectric cell and be added to the light from the controlled source of light to increase the magnitude of the reverse bias thereby decreasing the current flow through the field effect transistor. When the motor vehicle passes the automobile, the light from its headlamps is no longer directed at the photoelectric cell and therefore the magnitude of the reverse bias is decreased increasing current flow through the field effect transistor. This variation in current flow through the field effect transistor with changes in light intensity is used to control the energization and deenergization of a relay which in turn controls the flow of current through the filaments of the headlamps of the automobile so as to cause the headlamps to dim upon approach of the motor vehicle and to brighten upon passing of the motor vehicle.

For a better understanding of my invention and other advantages thereof reference should be had to the accompanying schematic diagram of the preferred embodiment.

In the schematic diagram, the high beam filaments of the headlamps of the automobile are illustrated by the two filaments 10 and 12, the low beam filaments of the headlamps are illustrated by the two filaments 14 and 16, and the foot switch by the switch 18. When the foot switch 18 is in the high beam position current flows directly from the positive terminal 20 of the battery through the foot switch 18 and the high beam filaments 10 and 12 to the negative or grounded terminal 22 of the battery to light the high beam filaments. When the foot switch 18 is in its low beam position, whether the high or low beam filaments are energized will depend on the position of the armature 26 of a relay 24. With the relay 24 deenergized the armature is positioned against a normally closed contact 28 and current flows from the positive terminal 20 of the battery through the foot switch 18, the armature 26, the normally closed contact 28 and the low beam filaments 14 and 16 to the negative terminal 22 of the battery to light the low beam filaments. With the relay energized the armature is positioned against a normally open contact 29 and current flows from the positive terminal 20 of the battery, through the foot switch 18, the armature 28, the normally open contact 29 and the high beam filaments 10 and 12 to the negative terminal 22 of the battery to light the high beam filaments.

The coil 30 of the relay 24 is connected between the positive terminal 20 and the emitter of a PNP transistor 32. The collector of the PNP transistor 32 is connected directly to the negative terminal 22, and the base of the PNP transistor 32 is connected directly to the collector of a NPN transistor 36 whose emitter is connected to the negative terminal 12 and through a biasing resistor 34 to the positive terminal 20. Therefore, the energization of the relay 30 depends on the voltage drop across biasing resistor 34 which in turn depends on the current flow through the transistor 36.

Current flow through the NPN transistor 36 is controlled by a circuit including a field effect transistor 38 and a photoelectric cell 40 connected between the gate terminal of the field effect transistor 38 and the positive terminal 20. The source terminal of the field effect transistor 38 is connected to a sliding tap on a resistor 42 which is connected in series with another resistor 44 between the positive and negative terminals 20 and 22. The drain terminal of the field effect transistor is connected directly to the base of the NPN transistor 36 and through a thermistor 45 to the negative terminal 22. Current flows from the positive terminal 20 through resistor 42 and its sliding tap, the field effect transistor 38 and the thermistor 45 to provide a voltage drop across the thermistor 45 which determines the current flow through the NPN transistor 36.

The photoelectric cell 40 is connected between the positive terminal 20 and the gate of the field effect transistor 38. Therefore, the amount of flow through the field effect transistor 38 and the voltage drop across the thermistor 45 depends upon the amount of light shining in the photoelectric cell. In accordance with the present invention, to set the quiescent operating point of the field effect transistor 38 at the desired value, the light from a lamp 46 is directed at the cathode of the photoelectric cell 40 to provide a level of current flow through the photoelectric cell which sets the current flow through the field effect transistor 38. To make sure this quiescent current flow remains fixed the lamp is connected to the terminals 20 and 22 in a voltage and current regulating circuit. The voltage and current regulating circuit comprises a resistor 48 and a lamp 50 in series with the lamp 46 between positive and negative terminals 20 and 22; a zener diode 52 in shunt with the lamp 50 and the lamp 46; and a resistor 54 in shunt with the lamp 46.

The photoelectric cell is positioned behind a lens 56 arranged to pick up the light of the headlamps of oncoming motor vehicles and transmit it to the photo cell. When there are no oncoming motor vehicles and the foot switch 18 is in its low beam position the level of conductivity through the field effect transistor is substantially that set by the lamp 46. At this level of conductivity the relay 24 and the high beam filaments 10 and 12 are energized.

When another automobile approaches, the light from its headlamps is picked up by the lens 56 and transmitted to the photo cell where it is added to the light from the lamp 46. This increases the current flow through the photo cell increasing the magnitude of the negative bias on the gate of the field effect transistor. This decreases the current flow through the field effect transistor. The decrease in current flow through the field effect transistor drops the potential across the thermistor 45 which in turn cuts the current flow through the NPN transistor 36. A drop in current flow through the NPN transistor 36 decreases the potential drop across the resistor 34 reducing the current through the coil of the relay sufficiently to cause the relay to become deenergized. With deenergization of the relay the circuit through the high beam filaments 10 and 12 is broken by the armature 26 and the circuit through the low beam filaments 14 and 16 is completed by armature 26 thereby dimming the headlamps. When the vehicle pass each other, the decrease in light intensity will cause the relay to be reenergized turning on the high beams once again.

In certain cases it is desirable that the switching of the headlamps not be automatically controlled. For this purpose a switch 58 is connected between the coil 30 of the relay and the emitter of the PNP transistor 32. When this switch is open it prevents energization of the coil of the relay therefore leaving the low beam of the headlamps on unless the foot switch 18 is depressed.

The circuit as shown at 60 is fused and is provided with a panel switch 62 which will cut off excitation to the headlamps altogether for daylight driving and when the car is not being used.

The tap on resistor 42 can be adjusted for variations in sensitivity from circuit to circuit. The thermistor 45 was employed instead of an ordinary resistor to compensate for variations in ambient temperature. A diode 64 is connected in shunt with the coil 30 and switch 58 to prevent switching transients from burning out the transistor 32.

The invention has now been described in its preferred embodiment it will be understood that the present invention is not limited to the preferred embodiment but it is intended to cover all changes and modifications which do not constitute departure from the spirit and scope of the invention.

What is claimed is:

1. A headlight control circuit for an automobile which automatically dims the headlamps of the automobile at the approach of an oncoming lighted vehicle comprising; an electromagnetic relay having armature means connected to a source of direct current potential, a first contact means connected to the low beam filaments of the headlamps, a second contact means connected to the high beam filaments of the headlamps and a coil which can be energized and de-energized to position the armature means in contact with the first or second contact means; amplifying means having an output circuit coupled to said coil to supply current thereto and an input circuit which includes a field effect transistor having a gate, a source, and a drain electrode; a photoelectric cell positioned for receiving light from the headlamps of approaching vehicles, said photoelectric cell having a cathode connected to the gate electrode of said field effect transistor so that light variations applied to said photoelectric cell produce variations from a bias level of output current of said amplifying means, and a controlled source of light which is positioned so that light therefrom is directed at said photoelectric cell to produce said bias level of output current of said amplifying means which permits energization of the high beam filaments, said variations from said level of output current causing the high beam filaments to be de-energized and the low beam filaments to be energized.

2. A headlight control circuit as claimed in claim 1 wherein said controlled source of light comprises an electric lamp and a current control means for regulating the amount of light produced by the lamp.

3. A headlight control circuit as claimed in claim 1 wherein a diode is connected across said coil of said electromagnetic relay to absorb the inductive spark generated by the collapse of the electric field of said coil.

4. A headlight control circuit as claimed in claim 1 wherein said current control means includes a zener diode coupled to the electric lamp.

References Cited

UNITED STATES PATENTS

| | | | |
|---|---|---|---|
| 2,907,920 | 10/1959 | McIlvaine | 250—214 |
| 2,913,636 | 11/1959 | Morrow | 315—82 X |
| 3,042,805 | 7/1962 | Boersma | 250—207 |
| 3,144,560 | 8/1964 | Merriman | 250—205 X |
| 3,171,032 | 2/1965 | Holt | 250—207 |

WALTER STOLWEIN, *Primary Examiner.*